United States Patent
Shimizu (10) Patent No.: US 6,676,854 B2
(45) Date of Patent: Jan. 13, 2004

(54) GADORINIUM OXYSULFIDE PHOSPHOR FOR DIGITAL RADIOGRAPHY, RADIOGRAPHIC IMAGE CONVERSION SCREEN AND RADIOGRAPH-FORMING DEVICE

(75) Inventor: Etsuo Shimizu, Kanagawa (JP)

(73) Assignee: Kasei Optonix, Ltd., Odawara (JP)

( * ) Notice: Subject to any disclaimer, the term of this patent is extended or adjusted under 35 U.S.C. 154(b) by 0 days.

(21) Appl. No.: 10/176,605

(22) Filed: Jun. 24, 2002

(65) Prior Publication Data
US 2003/0047714 A1 Mar. 13, 2003

(30) Foreign Application Priority Data

Jun. 25, 2001 (JP) .......................... 2001-191427
May 8, 2002 (JP) .......................... 2002-132348

(51) Int. Cl.$^7$ ............... C09K 11/84; G21K 4/00
(52) U.S. Cl. ............ 252/301.45; 378/6; 378/98; 428/690; 250/483.1; 250/484.1; 250/486.1
(58) Field of Search ............ 252/301.48; 378/6, 378/98; 428/690; 250/483.1, 484.4, 486.1

(56) References Cited

U.S. PATENT DOCUMENTS 4,839,243 A  6/1989 Shimizu et al.
4,888,129 A  12/1989 Yale
4,925,594 A  5/1990 Yale

FOREIGN PATENT DOCUMENTS

| JP | 55-25411 B | 7/1980 |
|---|---|---|
| JP | 57-141482 | 9/1982 |
| JP | 62-79284 | 4/1987 |
| JP | 1-29834 | 6/1989 |
| JP | 7-278540 | 10/1995 |

OTHER PUBLICATIONS

Japanese Patent abstract and Dewent abstract for JP 62–79284.*

* cited by examiner

Primary Examiner—C. Melissa Koslow
(74) Attorney, Agent, or Firm—Oblon, Spivak, McClelland, Maier & Neustadt, P.C.

(57) ABSTRACT

A gadolinium oxysulfide phosphor for digital radiography represented by the following compositional formula, which mainly emits a green luminescence under excitation with radiation:

$$(Gd_{1-x-y-z}Tb_x Dy_y Ce_z)_2 O_2 S$$

wherein x, y and z are numbers which satisfy $1.2\times10^{-3} \leq x \leq 1.9\times10^{-2}$, $5\times10^{-4} \leq y \leq 19\times10^{-2}$ and $10^{-8} \leq z \leq 8\times10^{-7}$, respectively.

9 Claims, 5 Drawing Sheets

GADORINIUM OXYSULFIDE PHOSPHOR FOR DIGITAL RADIOGRAPHY, RADIOGRAPHIC IMAGE CONVERSION SCREEN AND RADIOGRAPH-FORMING DEVICE

BACKGROUND OF THE INVENTION

1. Field of the Invention

The present invention relates to a gadolinium oxysulfide phosphor for digital radiography which exhibits mainly green emission of high luminance with a short afterglow, under excitation with radiation such as X-rays or γ-rays, a high sensitive radiographic image conversion screen mainly for digital radiography, employing the phosphor for a fluorescent layer, and a radiograph-forming device which converts a radiographic image of an object into a visible image having a favorable image quality.

2. Discussion of Background

When a radiograph of an object is taken with a purpose of medical diagnosis or an industrial non-destructive inspection, a radiographic image conversion screen (hereinafter referred to as "image conversion screen" comprising a support of e.g. paper or a plastic and a fluorescent layer comprising a phosphor which emits luminescence under excitation with ionizing radiation such as X-rays, α-rays or γ-rays, particularly X-rays (hereinafter referred to as "a phosphor for X-ray excitation") is used. The image conversion screen is used in contact with a radiographic film (film). The object is irradiated with radiation, and transmitted radiation reach the film via the image conversion screen to form a radiograph. Particularly the image conversion screen used when a radiograph is taken by using a film, is called a radiation intensifying screen (intensifying screen).

In recent years, instead of a method of obtaining a radiograph by photography by analogue system utilizing an intensifying screen/film system wherein an intensifying screen and a film are combined, so-called digital radiography (hereinafter referred to simply as DR) has been used practically, wherein a radiograph of an object formed on an image conversion screen is photoelectrically detected by using a photoelectric conversion element such as a photodiode, a photomultiplier (PM), a CCD photosensor or a CCD camera and converted into digital signals, which are subjected to image processing electrically and converted into a visible image again.

When a radiograph is taken by means of the intensifying screen/film system, a phosphor to be used for the intensifying screen is selected depending upon the relation with properties such as spectral sensitivity of a film on which the radiograph is formed and fixed. Whereas, in a case where a radiograph is taken by means of DR employing an image conversion screen/photoelectric conversion element system, the consistency with the photoelectric conversion element for DR is important. Namely, it is important to select a phosphor which generates luminescence of high luminance in a wavelength region corresponding to the spectral sensitivity of the photoelectric conversion element for DR.

When a radiograph is taken by means of DR, a phosphor to be used for the image conversion screen for DR is required to be highly sensitive and provide a shorter afterglow (persistence), with a purpose of decreasing the exposure amount of a patient as an object and decreasing a noise in radiograph-forming system. However, as the phosphor for X-ray excitation to be used for the fluorescent layer of the image conversion screen for DR, a phosphor for an intensifying screen has been used. Gadolinium oxysulfide ($Gd_2O_2S$:Tb) phosphor activated by terbium (Tb) is one of typical phosphors for intensifying screens (JP-B-55-25411). When an image conversion screen employing this phosphor for a fluorescent layer is used for DR, no adequate sensitivity in radiograph-forming system or reduction of afterglow can be achieved, and their improvements have been desired.

On the other hand, with regard to a Tb-activated oxysulfide type phosphor to be used for a cathode ray tube for display, it has been proposed to co-activate an oxysulfide of e.g. Y, Gd, La or Lu by Tb and Dy to suppress decrease in brightness due to current saturation at a high current density region when the phosphor is irradiated with electron rays having a high current density, thereby to improve emission luminance (JP-A-57-141482).

Further, as a Tb-activated oxysulfide type phosphor to be used for a cathode ray tube for display, a phosphor obtained by incorporating a rare earth element such as Tb, Pr, Dy or Tm and Ce simultaneously into an oxysulfide of e.g. Y, Gd, La or Lu, which can suppress deterioration of emission luminance due to burning of the phosphor when the phosphor is used for a fluorescent layer of a cathode ray tube for display and operated under irradiation with electron rays having a high current density for a long period of time, has been proposed (JP-A-62-79284). However, no phosphor containing Tb, Dy and Ce simultaneously is specifically disclosed, and no emission properties under excitation with X-rays are disclosed either.

Further, as confirmed by the present inventors as described hereinafter, when an intensifying screen employing such a phosphor comprising a $Gd_2O_2S$:Tb phosphor co-activated by Dy for a fluorescent layer is used in combination with an orthochromatic (ortho) type film to take a radiograph, the speed decreases contrary to expectation, as compared with an intensifying screen employing a conventional $Gd_2O_2S$:Tb phosphor not co-activated by Dy for a fluorescent layer. Namely, with respect to the phosphor comprising $Gd_2O_2S$:Tb co-activated by Dy, it is unclear whether co-activation by Dy contributes to improvement of emission luminance under excitation with X-rays, in a phosphor to be used for an image conversion screen for DR wherein an object is irradiated with X-rays to form a radiograph, which is detected by a photodetector such as a photodiode, apart from a case of irradiation with electron rays having a high current density.

SUMMARY OF THE INVENTION

Under these circumstances, it is an object of the present invention to overcome the above problems and to provide a $Gd_2O_2S$:Tb type phosphor for DR, which further improves emission luminance under excitation with X-rays, which shortens an afterglow and which has a consistency with a detector for DR. Another object of the present invention is to provide an image conversion screen for DR, which has a high sensitivity and which is less susceptible to deterioration in image quality due to influence of e.g. an afterimage, and a radiograph-forming device capable of forming a radiograph with a high image quality.

The present inventors have produced various $Gd_2O_2S$:Tb type phosphors wherein a second or a third element is added to a Tb activator for co-activation, which are irradiated with X-rays, and the emission is detected with a photoelectric conversion element for DR such as a photodiode, to study the effect of improving emission luminance by the above co-activator and afterglow properties in detail. As a result, they have succeeded in providing a $Gd_2O_2S$:Tb type phosphor which has a high sensitivity, which is less susceptible to deterioration in image quality due to influences of e.g. afterglow and which is thereby suitable for an image conversion screen for DR, by co-activating $Gd_2O_2S:Tb$ by specific amounts of Dy and Ce, or by further incorporating a specific amount of Zn thereinto, and providing a high sensitive image conversion screen and a radiograph-forming device. Further, they have succeeded in providing an image conversion screen and a radiograph-forming device, having a higher sensitivity, by employing such a construction that a plurality of fluorescent layers are used for the image conversion screen, and a fluorescent layer comprising a phosphor in the form of fine particles having specific particle sizes is disposed on the support side. The construction of the present invention will be described below.

(1) A gadolinium oxysulfide phosphor for DR represented by the following compositional formula, which mainly emits green luminescence under excitation with radiation:

$(Gd_{1-x-y-z}Tb_x Dy_y Ce_z)_2 O_2 S$ wherein x, y and z are numbers which satisfy $1.2 \times 10^{-3} \leq x \leq 1.9 \times 10^{-2}$, $5 \times 10^{-4} \leq y \leq 1.9 \times 10^{-2}$ and $10^{-8} \leq z \leq 8 \times 10^{-7}$, respectively.

(2) The gadolinium oxysulfide phosphor for DR according to the above (1), wherein x, y and z are numbers which satisfy $2 \times 10^{-3} \leq x \leq 7 \times 10^{-3}$, $1.8 \times 10^{-3} \leq y \leq 1.4 \times 10^{-2}$ and $5 \times 10^{-8} \leq z \leq 4 \times 10^{-7}$, respectively.

(3) The gadolinium oxysulfide phosphor for DR according the above (1) or (2), which contains zinc (Zn).

(4) The gadolinium oxysulfide phosphor for DR according to the above (3), wherein the content of zinc (Zn) is from 10 to 100 ppm.

(5) The gadolinium oxysulfide phosphor for DR according to the above (4), wherein the content of zinc (Zn) is from 20 to 70 ppm.

(6) The gadolinium oxysulfide phosphor for DR according to any one of the above (1) to (5), which has an average particle size of from 1 to 5 µm.

(7) The gadolinium oxysulfide phosphor for DR according to the above (6), which has an average particle size of from 2 to 4 µm.

(8) The gadolinium oxysulfide phosphor for DR according to any one of the above (1) to (7), wherein the maximum peak wavelength of the emission spectrum of the phosphor is within a wavelength range of from 520 to 580 nm.

(9) A radiographic image conversion screen which comprises a support and a fluorescent layer made of a mixture of a binder and a phosphor formed on the support, wherein the phosphor is a gadolinium oxysulfide phosphor for DR as defined in any one of the above (1) to (8).

(10) The radiographic image conversion screen according to the above (9), which comprises a plurality of the fluorescent layers.

(11) The radiographic image conversion screen according to the above (10), wherein at least the fluorescent layer in contact with the support comprises the gadolinium oxysulfide phosphor for DR as defined in the above (6) or (7).

(12) The radiographic image conversion screen according to any one of the above (9) to (11), wherein a protective layer is formed on the fluorescent layer.

(13) A radiograph-forming device, comprising at least a radiographic image conversion screen which absorbs radiation transmitted through an object and forms a fluorescence image of the object, a plurality of photoelectric conversion elements disposed on each of regions on the screen two-dimensionally and finely divided in a matrix, a processing means which processes disposition signals and detections signals from each of the photoelectric conversion elements corresponding to the fluorescent image formed by the radiation for two-dimensional synthesis and outputs digital image signals corresponding to the fluorescence image formed by the radiation, and an image reproduction means which inputs the digital image signals from the processing means to reproduce the fluorescent image formed by the radiation, wherein the radiographic image conversion screen is a radiographic image conversion screen as defined in any one of the above (9) to (12).

(14) The radiograph-forming device according to the above (13), wherein the digital image signals are subjected to an image processing by means of an image processing means, and then input into the image reproduction means.

(15) The radiograph-forming device according to the above (13) or (14), wherein the peak of the spectral sensitivity of the photoelectric conversion elements is in a wavelength region of from 450 to 650 nm.

(16) The radiograph-forming device according to any one of the above (13) to (15), wherein each of the photoelectric conversion element is a photodiode.

(17) The radiograph-forming device according to the above (16), wherein the photodiode is an amorphous silicon photodiode or a silicon photodiode having a peak of the spectral sensitivity within a wavelength region of from 500 to 600 nm.

DETAILED DESCRIPTION OF THE PREFERRED EMBODIMENTS

Now, the present invention will be explained in detail below.

For production the gadolinium oxysulfide phosphor of the present invention, ① oxides of Gd, Tb, Dy and Ce (and Zn in a case where Zn is contained in the composition) or compounds such as nitrates, carbonates, sulfates or halides of Gd, Tb, Dy and Ce (and Zn as the case requires), which are capable of being converted to oxides of these metals by heating, in amounts to achieve the above compositional formula stoichiometrically, ② sulfur (S) and sodium carbonate ($Na_2CO_3$) as sulfurizing agents to sulfurize oxides and ③ a flux such as a phosphate of an alkali metal such as potassium phosphate monobasic ($KH_2PO_4$), lithium phosphate ($Li_3PO_4$) or disodium hydrogen phosphate ($Na_2HPO_4$) or an alkali metal nitrate such as sodium nitrate ($NaNO_3$) or potassium nitrate ($KNO_3$), are added and thoroughly mixed to prepare a phosphor raw material mixture. In production of the phosphor containing Zn of the present invention, it is particularly preferred to employ as a flux an alkali metal nitrate, whereby a phosphor having a thin body color and having a small particle size can be obtained.

Then, such a phosphor raw material mixture is packed in a heat resisting container made of e.g. alumina equipped with a lid, and fired in the atmosphere at a temperature of from 900 to 1,300° C. for from 2 to 10 hours. After the firing, the fired cake was washed while it is broken into flakes in e.g. water to remove the flux, and then dried and subjected to a usual post-treatment in production of a phosphor such as sieving to obtain a powder of the phosphor of the present invention. In a case where the obtained phosphor powder has a pale liver brown body color, it is preferably reheated at a temperature of from 450 to 500° C. to remove the body color, in order to increase the powder reflectance of the phosphor and to suppress absorption of emission by itself, whereby the emission luminance is further improved. A pale yellow body color may remain even after the reheat treatment in some cases, and such a pale yellow body color is remarkable when the particle size is small. In such a case, a powder having a white body color can be obtained by incorporating Zn into the phosphor having a small particle size. However, the effect of reducing the body color by incorporating Zn into the phosphor matrix becomes small as the particle size of the oxysulfide phosphor becomes large. Accordingly, the firing temperature, time and atmosphere when a compound of Zn is added to the phosphor raw material mixture and fired may be adjusted to obtain a Zn-containing phosphor having an average particle size of from about 1 to about 5 µm, whereby a rare earth oxysulfide phosphor having a white body color and a high luminance can be obtained.

For production of a phosphor in the form of fine particles, in addition to adjustment of firing conditions such as firing temperature, time and atmosphere at the time of the firing of the phosphor raw material mixture, in a case where rare earth oxide is used as the raw material compound ①, a rare earth oxide in the form of fine particles having an average particle size of from 1 to 3 µm which is smaller than that of a conventional used rare earth oxide material, may be used, and when Zn is further used as the phosphor raw material, a nitrate of an alkali metal is added as a flux, and the mixture is fired, a phosphor in a form of fine particles having an average particle size of from 1 to 5 µm and having a thin body color can be obtained.

The plurality of the rare earth element compounds ① among the phosphor raw materials may preliminarily be dissolved in e.g. a mineral acid and then oxalic acid may be added thereto to co-precipitate oxalates of rare earth elements, which are then calcined to obtain mixed oxides, and then the remaining material compounds ① and ③ may be added thereto, followed by firing.

By co-activation of the Tb-activated gadolinium oxysulfide by a specific amount of Dy, emission luminance detected by a photoelectric conversion element for DR under excitation with X-rays tends to improve, and when the phosphor is further co-activated by a specific amount of Ce together with Dy, the afterglow can be reduced without decreasing the emission luminance of the phosphor to be obtained. Particularly in a case where Ce is contained, when Gd, Dy and Ce are preliminarily co-precipitated as mentioned above, the effect of reducing the afterglow can further be increased. Further, when a Zn compound is used as the phosphor raw material ① and a specific amount of Zn is contained in the phosphor, substantially no body color of the obtained phosphor is confirmed as described above, and emission luminance under excitation with X-rays can further be improved.

Figure 1A:
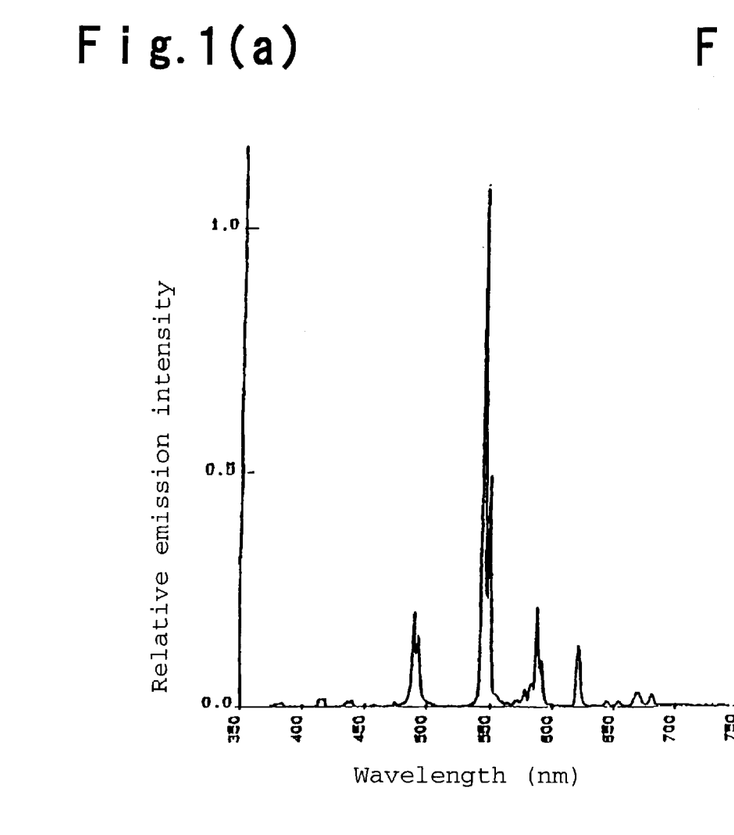
FIG. 1(a) is a graph illustrating the emission spectrum when the gadolinium oxysulfide phosphor co-activated by Tb, Dy and Ce of the present invention is irradiated with X-rays to emit luminescence.
Figure 1B:
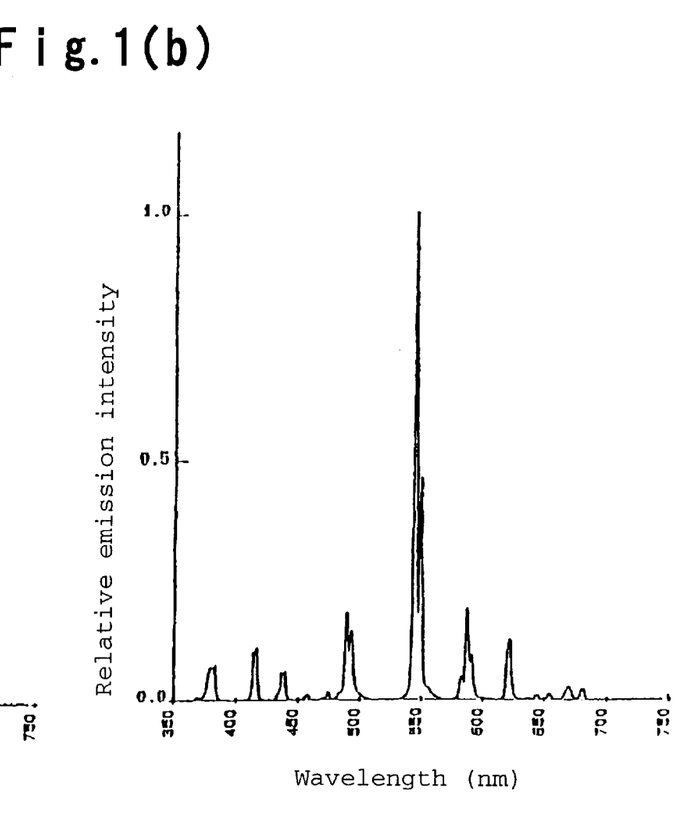
FIG. 1(b) is a graph illustrating the emission spectrum when a conventional gadolinium oxysulfide phosphor activated by Tb is irradiated with X-rays to emit luminescence.

FIGS. 1(a) and 1(b) are emission spectra when a Tb-activated gadolinium oxysulfide type phosphor is irradiated with X-rays to emit luminescence. FIG. 1(a) is an emission spectrum of a $(Gd_{0.991}Tb_{0.004}Dy_{0.005}Ce_{0.0000001})_2O_2S$ phosphor which is one of the gadolinium oxysulfide phosphors of the present invention obtained as described above, and FIG. 1(b) is an emission spectrum of a $(Gd_{0.996}Tb_{0.0004})_2O_2S$ phosphor.

As shown in FIGS. 1(a) and 1(b), there is substantially no difference in positions of peak wavelengths in the spectrum between the gadolinium oxysulfide phosphor of the present invention (FIG. 1(a)) and the conventional gadolinium oxysulfide phosphor containing no Dy (FIG. 1(b)), but the relative intensity ratio in intensity of the peak wavelength at a wavelength region of from 480 to 500 nm relative to the peak intensity at a wavelength region of from 350 to 450 nm is particularly high in the emission spectrum of the gadolinium oxysulfide phosphor of the present invention (FIG. 1(a)), as compared with that in the emission spectrum of the conventional gadolinium oxysulfide phosphor (FIG. 1(b)), and particularly the peak intensity in the vicinity of 545 nm (intensity of green emission) is relatively high.

Now, the image conversion screen of the present invention will be described below.

The image conversion screen of the present invention is produced in the same manner as a conventional image conversion screen except that the gadolinium oxysulfide phosphor of the present invention is employed for a fluorescent layer. Namely, the phosphor of the present invention comprising a gadolinium oxysulfide matrix co-activated by Tb, Dy and Ce, and further containing Zn as the case requires, is mixed with a binder such as cellulose nitrate in appropriate amounts, and an organic solvent is further added thereto to prepare a coating dispersion of phosphor having a suitable viscosity. A support as mentioned hereinafter is coated with this coating dispersion of phosphor by means of e.g. a knife coater or a roll coater, followed by drying to form a fluorescent layer. The support is coated with the coating dispersion of phosphor in such an amount that the weight of the phosphor coated after drying would be from 10 to 200 $mg/cm^2$, preferably from 30 to 150 $mg/cm^2$.

As the fluorescent layer of the image conversion screen of the present invention, a plurality of fluorescent layers may be provided by overlaying at least two types of fluorescent layers made of phosphors having different compositions, particle sizes, particle size distributions, etc., on the support. Particularly when a plurality of fluorescent layers made of at least two types of phosphors having different particle sizes are provided, it is more preferred to dispose the fluorescent layers in such an order that the average particle size of the phosphor particles constituting each fluorescent layer becomes large from the support side (innermost layer side) toward the surface side from which the emitted luminescence is taken out (outermost layer side), whereby emission luminance as an image conversion screen can further be improved, and when the screen is combined with a photoelectric conversion element to form a radiograph, sensitivity in radiograph-forming system and sharpness of an image can be improved, thus further increasing the image quality.

As described above, to produce an image conversion screen having a plurality of phosphor layers made of phosphors having different particle sizes, a plurality of coating dispersion of phosphor in which phosphor particles having different average particle sizes are dispersed are prepared, and the support is coated with the coating dispersion of phosphor, from one comprising a phosphor having a smaller average particle size, followed by drying to laminate a plurality of fluorescent layers.

Further, as another method, a coating dispersion of phosphor comprising mixed phosphors obtained by mixing phosphors having different average particle sizes, and having a relatively low viscosity, is prepared, and a substrate is coated with the coating dispersion of phosphor, left to stand and slowly dried while the phosphors are sedimented on the support sequentially from a phosphor having a larger particle size, in accordance with Stokes' law, to separately form a fluorescent layer on the substrate, in which phosphor particles are disposed that the particle size gradually becomes small from the substrate side toward the surface side, and then the phosphor layer is peeled off from the substrate, and the side of the peeled fluorescent layer which was not in contact with the substrate (the surface side) and a support of an image conversion screen to be produced are adhered to each other, to produce an image conversion screen having a fluorescent layer (multilayer structure fluorescent layer) in which phosphor particles are disposed so that the particle size continuously increases from the support side (innermost layer side) toward the side from which the emitted luminescence is taken out (outermost layer side).

Here, in the image conversion screen of the present invention, "a plurality of fluorescent layers" includes the above-described multilayer structure fluorescent layer in addition to the laminate of a plurality of fluorescent layers made of phosphors having different particle sizes.

In the case of the image conversion screen having a plurality of fluorescent layers, it is preferred to dispose, at least as a fluorescent layer in direct contact with the support, a fluorescent layer comprising the gadolinium oxysulfide phosphor of the present invention in the form of fine particles having an average particle size of from about 1 to about 5 $\mu$m, more preferably from 2 to 4 $\mu$m. By disposing the layer comprising the gadolinium oxysulfide phosphor of the present invention in the form of fine particles as the fluorescent layer on the support side (innermost layer side), a fluorescent layer comprising a phosphor having a small particle size, having a white body color and having high powder reflectance and emission luminance, is disposed on the support side (innermost layer side), whereby emission from the fluorescent layer close to the surface (fluorescent layer on the upper layer side) can more efficiently be reflected and taken out on the surface of the screen, and accordingly emission luminance and image quality of an X-ray image can further be improved when the emission is accepted by a photoelectric conversion element such as a photodiode and measured. In such a case, it is particularly preferred to use, as a phosphor in the form of fine particles for the fluorescent layer in contact with the support, the gadolinium oxysulfide phosphor of the present invention having an average particle size of from about 1 to about 5 $\mu$m and containing Zn, whereby a high reflectance and a high emission luminance can be obtained.

The binder to be used for the coating dispersion of phosphor is not particularly limited so long as it is a binder which has conventionally been used for production of a fluorescent layer for an image conversion screen, such as cellulose acetate, ethyl cellulose, polyvinyl butyral, linear polyester, polyvinyl acetate, a vinylidene chloride/vinyl chloride copolymer, a vinyl chloride/vinyl acetate copolymer, polyalkyl-(meth)acrylate, polycarbonate, polyurethane, cellulose acetate butyrate, polyvinyl alcohol, gelatin, polysaccharide such as dextrin, or gum arabic, in addition to cellulose nitrate. The amount of the binder is preferably from 2 to 6 wt % based on the phosphor in the fluorescent layer, so as not to decrease the durability and sharpness of the image conversion screen.

The organic solvent to be used for preparation of the coating dispersion of phosphor may, for example, be ethanol, methyl ethyl ether, butyl acetate, ethyl acetate, ethyl ether or xylene.

Further, to the coating dispersion of phosphor, a dispersant such as phthalic acid or stearic acid, or a plasticizer such as triphenyl phosphate or diethyl phthalate, may be added as the case requires.

As the support to be used for the image conversion screen of the present invention, a thermoplastic resin such as polyolefin represented by polypropylene or polyethylene, polyamide, polyvinyl chloride or polyester, a polystyrene type resin, a polyolefin type resin, a polyacrylic type resin or a polycarbonate type resin may, for example, be employed. Among them, particularly preferred is a polyester resin such as polyethylene terephthalate, polybutylene terephthalate or polyethylene-2,6-naphthalate, in view of durability, heat resistance, chemical stability, etc.

After the fluorescent layer is formed on the support as mentioned above, a protective layer may be formed on the fluorescent layer as the case requires. The protective layer can be formed in the same manner as a conventional image conversion screen. Namely, a transparent film of e.g. polyethylene terephthalate, polyethylene naphthalate, polyethylene, polyvinylidene chloride or polyamide is laminated on the fluorescent layer; or a cellulose derivative such as cellulose acetate, nitrocellulose or cellulose acetate butyrate, or a resin such as polyvinyl chloride, polyvinyl acetate, a vinyl chloride/vinyl acetate copolymer, polycarbonate, polyvinyl butyral, polymethyl methacrylate, polyvinyl formal or polyurethane, is dissolved in a solvent to prepare a protective layer coating liquid having a suitable viscosity, and the fluorescent layer is coated with the coating liquid, followed by drying to form a protective layer. The thickness of the protective layer on the fluorescent layer of the image conversion screen of the present invention is preferably from 1 to 10 $\mu$m.

Figure 2:
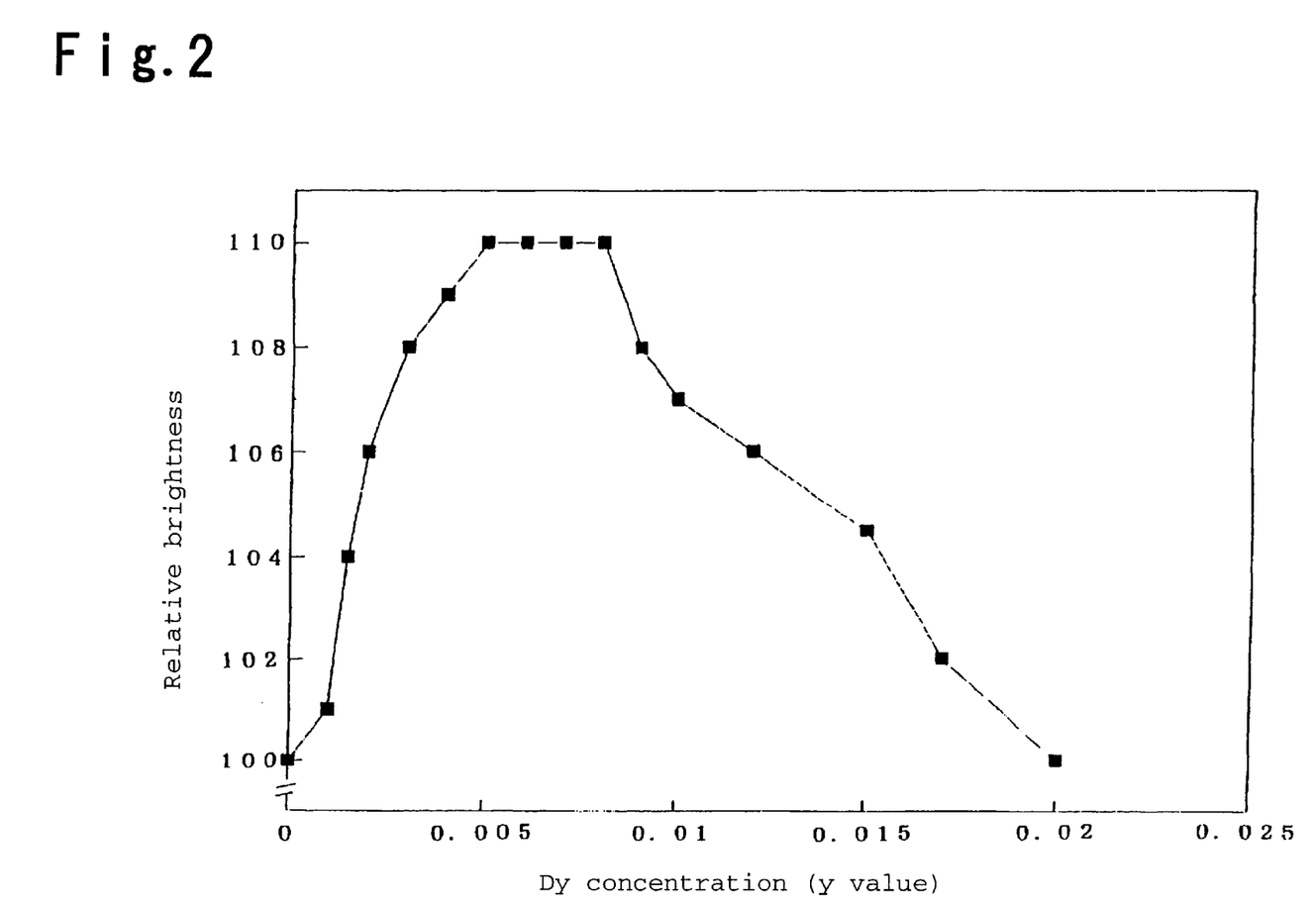
FIG. 2 is a diagram illustrating the dependence of the emission luminance of a radiographic image conversion screen employing a gadolinium oxysulfide phosphor, measured by a Si photodiode, on the Dy content.

FIG. 2 is a diagram illustrating the correlation between the emission luminance measured by means of a silicon photodiode as a photoelectric conversion element and the Dy concentration (y value), when a gadolinium oxysulfide phosphor co-activated by Tb, Dy and Ce is excited with X-rays to emit luminescence. Specifically, a plurality of image conversion screens employing for a fluorescent layer a $\{(Gd_{0.9959999-y}, Tb_{0.004}, Dy_yCe_{0.000001})_2O_2S\}$ phosphor wherein the Ce concentration is 0.00001 mol % ($z=1\times10^{-7}$) and the Tb concentration is 0.4 mol % ($x=4\times10^{-3}$) which is the same as that of a phosphor conventionally used for an intensifying screen, and the Dy concentration (y value) is variable, are prepared, and the relation between the relative emission luminance relative to the emission luminance of an image conversion screen employing for a fluorescent layer a phosphor containing no Dy (y=0), when irradiated with X-rays with a tube voltage of an X-ray tube of 80 kV, and the concentration of Dy as a co-activator of the phosphor for the image conversion screen (y value), is examined and shown in FIG. 2. The emission luminance was measured by contacting an Si photodiode (Model S1133, manufactured by Hamamatsu Photonics K.K.) to the surface of the fluorescent layer of each image conversion screen.

As evident from FIG. 2, when $(Gd_{0.9959999}, Tb_{0.004}, Ce_{0.000001})_2O_2S$ containing no Dy is co-activated by a specific amount of Dy, emission luminance is increased as compared with one not co-activated, the predetermined luminance of the present invention is obtained when the Dy concentration (y value) is within a range of from 0.05 to 1.9 mol % ($y=5\times10^{-4}$ to $1.9\times10^{-2}$), and a high luminance is obtained particularly within a range of from 0.18 to 1.4 mol % ($y=1.8\times10^{-3}$ to $1.4\times10^{-2}$).

Figure 3:
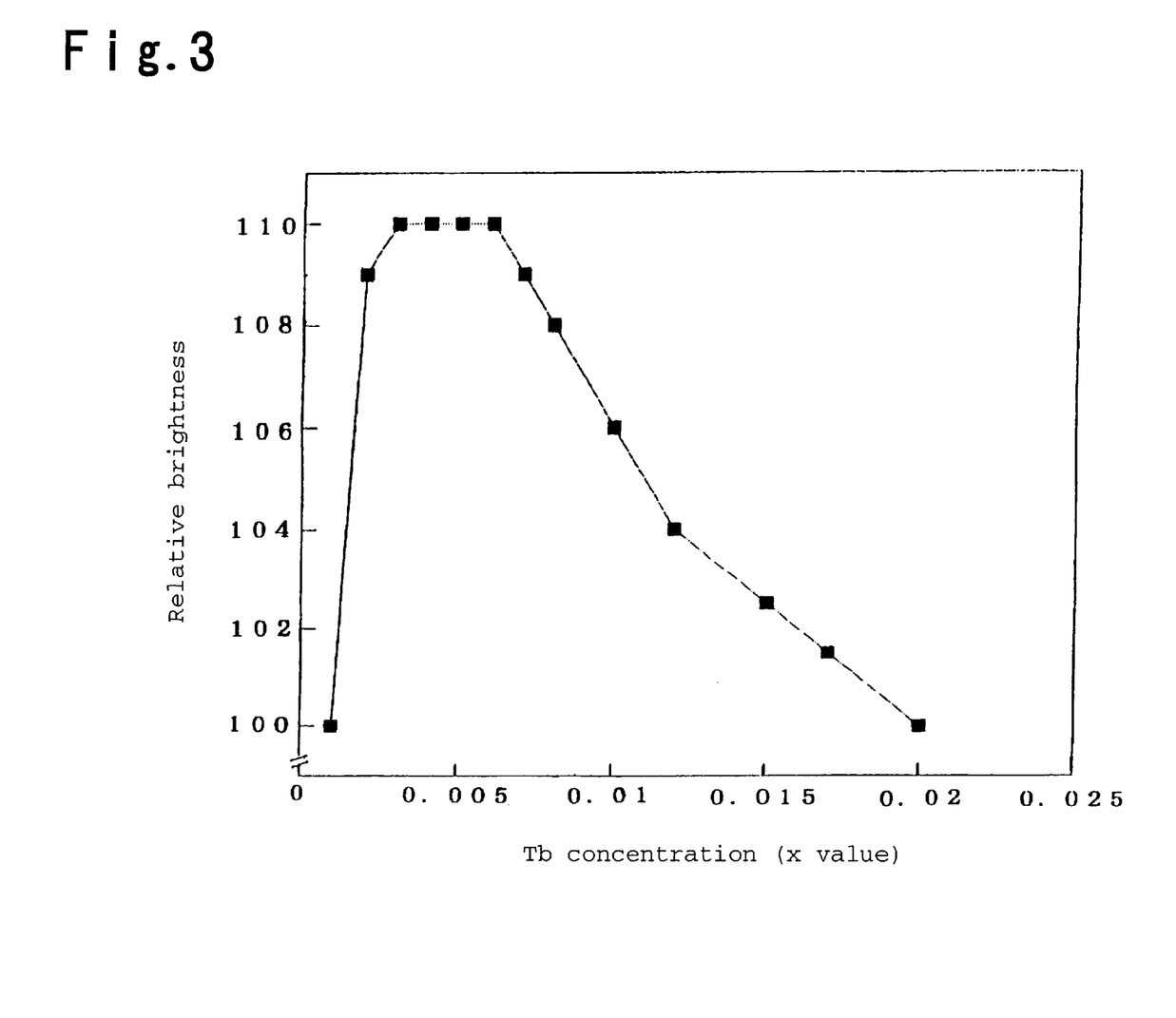
FIG. 3 is a diagram illustrating the dependence of the emission luminance of a radiography conversion screen employing a gadolinium oxysulfide phosphor, measured by a Si photodiode, on the Tb content.

FIG. 3 is a diagram illustrating the dependence of the emission luminance of the gadolinium oxysulfide phosphor co-activated by Tb, Dy and Ce under excitation with X-rays on the Tb concentration (x value), as measured in the same manner as for the data shown in FIG. 2. Specifically, a plurality of image conversion screens employing for a fluorescent layer a $\{(Gd_{0.9949999-x}, Tb_x, Dy_{0.005}Ce_{0.0000001})_2O_2S\}$ phosphor wherein the Ce concentration is 0.00001 mol % ($z=1\times10^{-7}$), the Dy concentration is 0.5 mol % ($x=5\times10^{-3}$) and the Tb concentration (x value) is variable, are prepared, and the relation between the emission luminance when irradiated with X-rays and the concentration of Tb as a co-activator of the phosphor in the fluorescent layer of the image conversion screen (x value) is shown. The emission luminance is represented by a relative value relative to the emission luminance of an image conversion screen employing a phosphor having a Tb concentration (x value) of 0.001, measured by using a silicon photodiode as a photoelectric conversion element and contacting it with the fluorescent layer of the image conversion screen, in the same manner as in the case of FIG. 2.

As evident from FIG. 3, the predetermined luminance of the present invention is obtained when the $\{(Gd_{0.9949999-x}, Tb_x, Dy_{0.005}Ce_{0.0000001})_2O_2S\}$ phosphor has a Tb concentration (x value) of from 0.12 to 1.9 mol % ($x=1.2\times10^{-3}$ to $1.9\times10^{-2}$), and a high luminance is obtained particularly within a range of from 0.2 to 0.7 mol % ($x=2\times10^{-3}$ to $7\times10^{-3}$).

Further, with respect to the image conversion screen employing for a fluorescent layer the gadolinium oxysulfide phosphor co-activated by Tb, Dy and Ce of the present invention, the dependence of the afterglow property on the Ce concentration (z value) is examined, whereupon the afterglow property is excellent with substantially no influence on the emission luminance when the Ce concentration (z value) is $z=10^{-8}$ to $8\times10^{-7}$. If it is less than $10^{-8}$, the afterglow is less likely to be reduced, and a double image due to the afterglow tends to be formed when a radiograph of a moving object is taken, such being disadvantageous. The afterglow is gradually reduced with an increase of the Ce concentration, but if the Ce concentration is higher than $8\times10^{-7}$, the emission luminance suddenly decreases. Particularly, the Ce concentration (z value) is more preferably $z=5\times10^{-8}$ to $4\times10^{-7}$. A phosphor having such a concentration is excellent from such a viewpoint that the afterglow is adequately reduced and substantially no decrease in the emission luminance is confirmed.

As mentioned above, from such a viewpoint that a higher luminance is obtained under excitation with X-rays as compared with a conventional phosphor and the afterglow is more reduced, of the gadolinium oxysulfide $(Gd_{1-x-y-z}, Tb_x, Dy_y, Ce_z)_2O_2S$ for DR to be used for the image conversion screen of the present invention, the Tb concentration (x value) and the Dy concentration (y value) are preferably within ranges of $1.2\times10^{-3} \leq x \leq 1.9\times10^{-2}$ and $5\times10^{-4} \leq y \leq 1.9\times10^{-2}$, more preferably within ranges of $2\times10^{-3} \leq x \leq 7\times10^{-3}$ and $1.8\times10^{-3} \leq y \leq 1.4\times10^{-2}$, and furthermore preferably within ranges of $3\times10^{-3} \leq x \leq 6\times10^{-3}$ and $2.5\times10^{-3} \leq y \leq 1.2\times10^{-2}$, respectively. The Ce concentration (z value) is required to be higher than about $10^{-8}$ so as to reduce the afterglow regardless of the x value and y value, but it is preferably within a range of $10^{-8} \leq z \leq 8\times10^{-7}$, particularly preferably within a range of $5\times10^{-8} \leq z \leq 4\times10^{-7}$, since the emission luminance of the phosphor gradually decreases if the Ce concentration is higher than $8\times10^{-7}$.

Further, among the phosphors of the present invention, a gadolinium oxysulfide phosphor comprising a phosphor in the form of fine particles having an average particle size smaller than about 5 μm and containing Zn in an amount of at least about 10 ppm based on the phosphor, has a remarkably reduced degree of its body color and an improved emission luminance as compared with the gadolinium oxysulfide phosphor containing no Zn, and has further improved emission luminance under excitation with X-rays as measured by a silicon photodiode as compared with the gadolinium oxysulfide phosphor of the present invention containing no Zn. However, in such a case, if the Zn content is higher than about 100 ppm based on the phosphor, Zn tends to separate out without being taken into the phosphor crystals, and the emission luminance tends to be lower than that of the gadolinium oxysulfide phosphor of the present invention containing no Zn on the contrary. Accordingly, the amount of Zn contained in the gadolinium oxysulfide phosphor for DR of the present invention is preferably from about 10 to about 100 ppm, more preferably from 20 to 70 ppm, based on the phosphor in view of emission luminance. However, if the average particle size of the obtained oxysulfide phosphor is larger than about 5 μm, no adequate Zn may be introduced into the phosphor, and substantially no improvement of emission luminance due to incorporation of Zn may be confirmed.

Here, substantially no change in the emission spectrum was confirmed even if Zn in an amount of from 10 to 100 ppm is incorporated in the matrix composition in the gadolinium oxysulfide phosphor for DR of the present invention, and substantially no difference in preferred ranges of the Tb and Dy contents (x and y values) in view of emission luminance and a preferred range of the Ce content (z value) in view of reduction in the afterglow was confirmed as compared with the phosphor containing no Zn.

Figure 4:
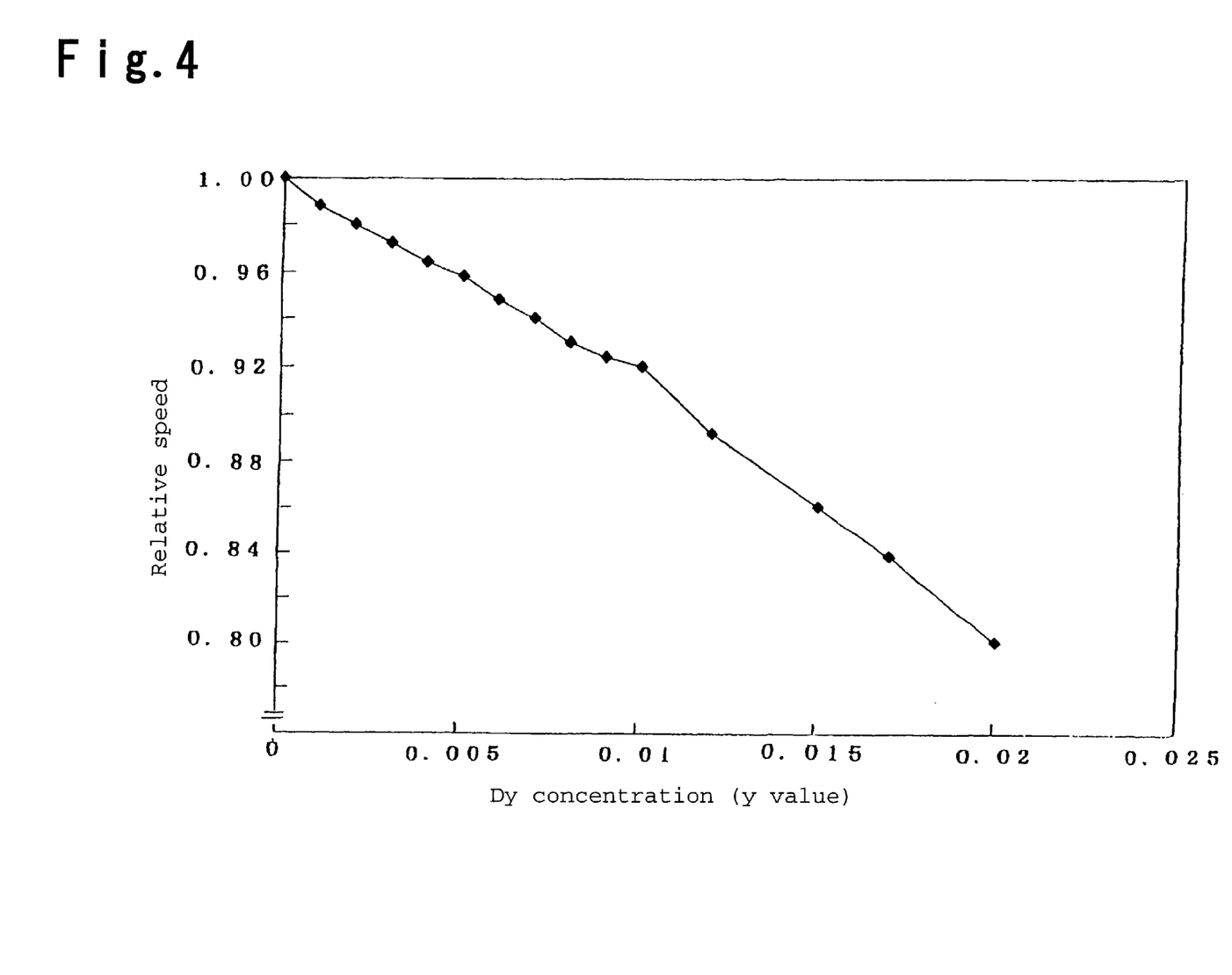
FIG. 4 is a diagram illustrating the dependence of the speed of an intensifying screen employing a gadolinium oxysulfide phosphor, on the Dy content.

FIG. 4 is a diagram illustrating the relation between the Dy concentration (y value) of the phosphor used for a fluorescent layer and the speed of the image conversion screen, when the image conversion screens having a fluorescent layer comprising a gadolinium oxysulfide phosphor $\{(Gd_{0.9959999-y}, Tb_{0.004}, Dy_yCe_{0.0000001})_2O_2S\}$ wherein 0.00001 mol % (z=0.0000001) of Ce is contained, and the Tb concentration is 0.4 mol % (x=0.004) as same as that of a phosphor which has conventionally been used for an intensifying screen, and the Dy concentration (y value) is variable, i.e. the image conversion screens used for measurement of the data shown in FIG. 2, are used as intensifying screens in combination with a film. The speed of the image conversion screen was measured by contacting the film with the surface of the fluorescent layer of each image conversion screen in the same manner as in measurement of the speed of a usual intensifying screen, followed by irradiation with X-rays in a certain amount and development of the film, and obtained from the photographic density.

In FIG. 4, the speed of the ordinate is a relative value for the photographic density when an image conversion screen employing for the fluorescent layer each of gadolinium oxysulfide phosphors having different Dy concentrations (y values) is used, relative to the photographic density when an image conversion screen employing for the fluorescent layer a gadolinium oxysulfide phosphor containing no Dy (y=0) is used, and the horizontal axis represents the Dy concentration (y value) in the phosphor. At that time, an ortho type X-ray film (model Super-HR-S30, manufactured by Fuji Photo Film Co., Ltd.) to be used in combination with a green emission intensifying screen was used.

As evident from FIG. 4, when the image conversion screen of the present invention is used as an intensifying screen in combination with a film, differently from a case where the screen is used in combination with a photoelectric conversion element such as a photodiode (FIG. 2), the speed does not improve but gradually decreases, even when the concentration of the co-activator Dy in the phosphor in the image conversion screen employing for the fluorescent layer a gadolinium oxysulfide phosphor co-activated by Dy and Ce is increased.

Figure 5:
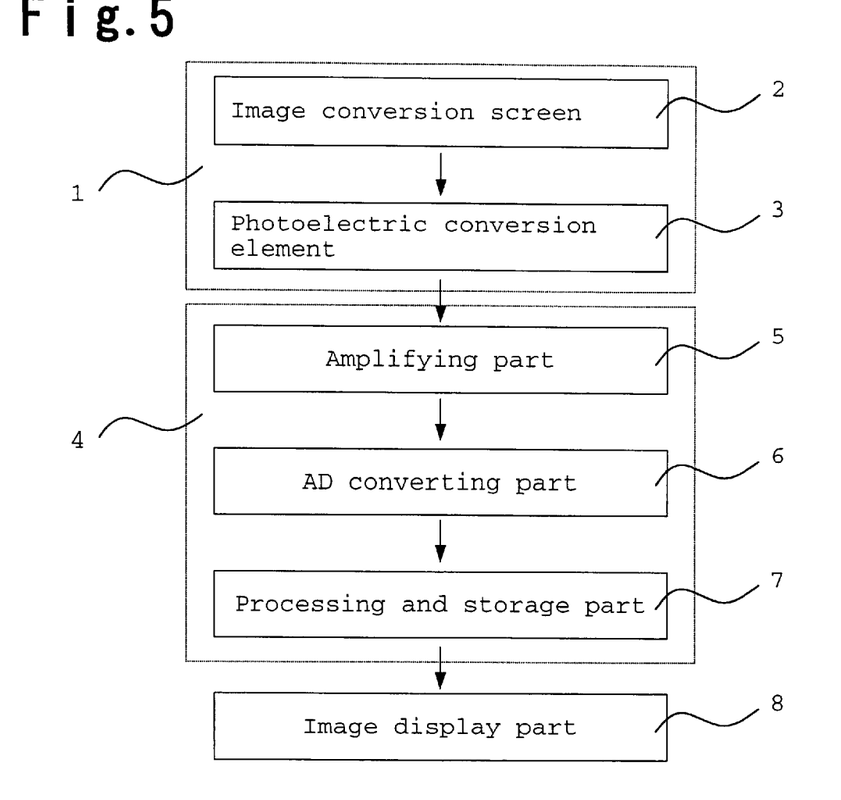
FIG. 5 is a block diagram illustrating the radiograph-forming device of the present invention.

FIG. 5 is a block diagram illustrating one example of the radiograph-forming device of the present invention. Basically, the device comprises an image conversion part 1 comprising an image conversion screen 2 which absorbs radiation transmitted through an object and converts them into a fluorescence image, and a plurality of photoelectric conversion elements 3 disposed in each of regions on the surface of the fluorescent layer of the image conversion screen 2 two-dimensionally and finely divided in a matrix, a processing part 4 comprising an amplifying part 5 which amplifies detected analog signals from each of the photoelectric conversion elements 3, an AD converting part 6 which converts the amplified detected analog signals into digital signals, and a processing and storage part 7 which processes the digitized detected analog signals from each of the photoelectric conversion elements 3 and subjects the obtained digital image signals to two-dimensional synthesis, and an image display part 8 which displays a visible image by means of synthetic signals from the processing and storage part 7. Similar to a conventional radiograph-forming device, when or after the digitized detected analog signals from each of the photoelectric conversion elements 3 are processed and subjected to two-dimensional synthesis at the processing and storage part 7, image processing such as noise removal, data compression or gradation adjustment of an image may be carried out, then the signals are input into the image display part 8 having a display such as a cathode ray tube, whereby a radiograph of the object is displayed and observed.

Figure 6:
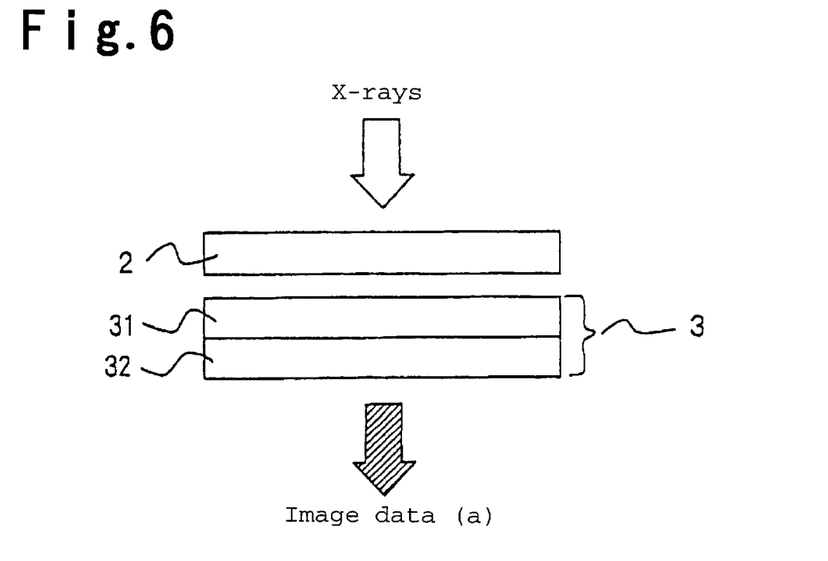
FIG. 6 is a schematic view illustrating an image conversion part of the radiograph-forming device of the present invention.

FIG. 6 is a schematic view illustrating the image conversion part 1 of the radiograph-forming device. X-rays transmitted through the object form a fluorescence image on the fluorescent layer of the image conversion screen 2 of the image conversion part 1. The plurality of the photoelectric conversion elements 3 are disposed on each of regions on the surface of the fluorescent layer of the image conversion screen two-dimensionally and finely divided in a matrix, so that they face the fluorescent layer, and photoelectrically convert the fluorescence image formed by the radiation on the surface of the fluorescent layer into electric signals on each of the divided regions. The image conversion screen 2 comprises a support (not shown) and a fluorescent layer comprising the gadolinium oxysulfide phosphor of the present invention formed on the support. In this example, the photoelectric conversion element 3 is a plane light sensor comprising a support (not shown) and a fine light semiconductor photo-detecting element 31 disposed on the support two-dimensionally in a matrix, and a switching element 32 such as a thin film transistor (TFT) combined therewith, and is disposed so that it faces the image conversion screen. The image conversion screen 2 and the photoelectric conversion element 3 are contacted with each other by means of an adhesive transparent to light. In the present invention, it is preferred to employ as the photoelectric conversion element 3 a photodiode having a spectral sensitivity peak within a wavelength region of from 500 to 600 nm, such as a silicon or amorphous silicon photodiode.

With the radiograph-forming device of the present invention employing the above construction, a radiograph excellent in an afterglow property with a high sensitivity can be obtained, and it is useful for diagnosis in a medical field, a test on foreign bodies in food products, or a non-destructive inspection of industrial products such as metal weldment as objects.

Now, the present invention will be described in further detail with reference to Examples. However, it should be understood that the present invention is by no means restricted to such specific Examples.

EXAMPLE 1

| | |
|---|---|
| Gadolinium oxide ($Gd_2O_3$, average particle size: 3.5 μm) | 718.7 g |
| Cerium oxide ($CeO_2$) | 0.07 mg |
| Terbium oxide ($Tb_4O_7$) | 3.0 g |
| Dysprosium oxide ($Dy_2O_3$) | 3.7 g |

The above components were adequately mixed, and to the obtained phosphor raw material, the following components as a flux and sulfurizing agents:

| | |
|---|---|
| Potassium phosphate monobasic ($KH_2PO_4$) | 36.3 g |
| Sodium carbonate ($Na_2CO_3$) | 280.0 g |
| Sulfur (S) | 220.0 g | were added and adequately mixed, and the mixture was packed in an alumina crucible and covered with a lid, and fired in the atmosphere at 1,200° C. for 3 hours. The obtained fired product was washed with water with stirring in water, the supernatant liquid was removed, and the fired product was further washed sequentially with 0.5 N hydrochloric acid and water, subjected to dehydration and drying, and baked in the air at 490° C. for 2 hours, followed by sieving for dispersion to obtain a phosphor of Example 1.

The crystal structure of the obtained phosphor was identified by means of an X-ray diffraction apparatus, and elemental analysis was carried out by means of a glow discharge mass spectrometer (GDMAS) and fluorometric analysis. As a result, the compositional formula was found to be $(Gd_{0.991},Tb_{0.004},Dy_{0.005}, Ce_{0.0000001})_2O_2S$. Further, the particle size and the particle size distribution of the phosphor were measured by a Coulter counter, and the average particle size was 5.0 μm and the standard deviation as represented by quartile deviation (Q.D.) was 0.25.

Then, 16 parts by weight of the phosphor of Example 1, 1 part by weight of polyvinyl butyral and an organic solvent were adequately mixed to prepare a coating dispersion of phosphor. The surface of a polyethylene terephthalate support having a light reflecting effect, having a titanium oxide powder incorporated therein, was uniformly coated with the coating dispersion of phosphor by means of a knife coater so that the weight of the coated phosphor after drying would be about 70 mg/cm$^2$, followed by drying to prepare a fluorescent layer. Then, on the surface of the fluorescent layer, a protective layer which is a transparent polyethylene terephthalate film having a thickness of about 6 μm was laminated to obtain an image conversion screen of Example 1.

The image conversion screen of Example 1 was irradiated with X-rays with a tube voltage of 80 kV, and the emission luminance was measured by means of a Si photodiode (Model S1133, manufactured by Hamamatsu Photonics K.K.) having a peak wavelength of the spectral sensitivity of about 550 nm. As a result, the emission luminance of the image conversion screen of Example 1 was about 110% of the emission luminance of an image conversion screen of Comparative Example 1 as mentioned hereinafter, as measured under the same conditions (Table 2).

Further, the image conversion screen of Example 1 was irradiated with X-rays generated under conditions of a tube voltage of 80 kV and a tube current of 3 mA for 3 minutes from a distance of 50 cm from the screen at a dark place, and one second after the irradiation with X-rays was terminated, an ortho type X-ray film was contacted with the surface of the fluorescent layer of the screen and left to stand for 30 minutes, and then the film was taken out and developed, to evaluate the degree of the afterglow of the image conversion screen from the photographic density of the film corresponding to the integrated amount of the afterglow while the screen was left to stand. As a result, the amount of the afterglow of the image conversion screen of Example 1 was one tenth of the amount of the afterglow of an image conversion screen of Comparative Example 1 as mentioned hereinafter, as measured under the same conditions (Table 2).

EXAMPLE 2

A phosphor of Example 2 having a compositional formula of $(Gd_{0.99},Tb_{0.005},Dy_{0.0051}Ce_{0.0000001})_2O_2S$ was produced in the same manner as in Example 1 except that a phosphor raw material was prepared by mixing gadolinium oxide $(Gd_2O_3)$, terbium oxide $(Tb_4O_7)$, dysprosium oxide $(Dy_2O_3)$ and cerium oxide $(CeO_2)$ so that the molar ratio of Gd, Tb, Dy and Ce would be $(Gd_{0.99},Tb_{0.005},Dy_{0.005},Ce_{0.0000001})_2O_2S$ stoichiometrically. The particle size and the particle size distribution of the phosphor were measured by a Coulter counter, and the average particle size was 5.2 μm and the standard deviation as represented by the quartile deviation (Q.D.) was 0.25.

Then, an image conversion screen of Example 2 was prepared in the same manner as in Example 1 except that the phosphor of Example 2 was used.

EXAMPLE 3

A phosphor of Example 3 having a compositional formula of $(Gd_{0.99},Tb_{0.003},Dy_{0.007},Ce_{0.0000003})_2O_2S$ was produced in the same manner as in Example 1 except that a phosphor raw material was prepared by mixing gadolinium oxide $(Gd_2O_3)$, terbium oxide $(Tb_4O_7)$, dysprosium oxide $(Dy_2O_3)$ and cerium oxide $(CeO_2)$ so that the molar ratio of Gd, Tb, Dy and Ce would be $(Gd_{0.99},Tb_{0.003},Dy_{0.007},Ce_{0.0000003})_2O_2S$ stoichiometrically. The particle size and the particle size distribution of the phosphor were measured by a Coulter counter, and the average particle size was 5.1 μm and the standard deviation as represented by the quartile deviation (Q.D.) was 0.25.

Then, an image conversion screen of Example 3 was prepared in the same manner as in Example 1 except that the phosphor of Example 3 was used.

EXAMPLE 4

A phosphor of Example 4 having a compositional formula of $(Gd_{0.99},Tb_{0.005},Dy_{0.005}Ce_{0.0000001})_2O_2S$ was produced in the same manner as in Example 2 except that a phosphor raw material mixture was prepared by mixing gadolinium oxide $(Gd_2O_3)$, terbium oxide $(Tb_4O_7)$, dysprosium oxide $(Dy_2O_3)$ and cerium oxide $(CeO_2)$ so that the molar ratio of Gd, Tb, Dy and Ce would be $(Gd_{0.99},Tb_{0.005},Dy_{0.005},Ce_{0.0000001})_2O_2S$ stoichiometrically, 70.0 g of lithium phosphate $(Li_3PO_4)$ and 30.0 g of disodium hydrogenphosphate $(Na_2HPO_4)$ were used instead of 36.3 g of potassium phosphate monobasic $(KH_2PO_4)$ as a flux, and the phosphor raw materials were fired at 1,200° C. for 4 hours. The particle size and the particle size distribution of the phosphor were measured by a Coulter counter, and the average particle size was 8.0 μm and the standard deviation as represented by the quartile deviation (Q.D.) was 0.23.

Then, an image conversion screen of Example 4 was prepared in the same manner as in Example 1 except that the phosphor of Example 4 was used.

EXAMPLE 5

A phosphor of Example 5 having a compositional formula of $(Gd_{0.99},Tb_{0.005},Dy_{0.005},Ce_{0.0000001})_2O_2S$ was produced in the same manner as in Example 1 except that the amount of potassium phosphate monobasic $(KH_2PO_4)$ as a flux was changed from 36.3 g to 30.0 g, and the phosphor raw material mixture was fired at 1,100° C. for 3 hours. The particle size and the particle size distribution of the phosphor were measured by a Coulter counter, and the average particle size was 3.0 μm and the standard deviation as represented by the quartile deviation (Q.D.) was 0.26.

Then, an image conversion screen of Example 5 was prepared in the same manner as in Example 1 except that the phosphor of Example 5 was used.

EXAMPLE 6

A phosphor of Example 6 having a compositional formula of $(Gd_{0.990},Tb_{0.005}, Dy_{0.005},Ce_{0.0000001})_2O_2S$ was produced in the same manner as in Example 2 except that gadolinium oxide $(Gd_2O_3)$, terbium oxide $(Tb_4O_7)$, dysprosium oxide $(Dy_2O_3)$ and cerium oxide $(CeO_2)$ were mixed to prepare a phosphor raw material so that the molar ratio of Gd, Tb, Dy and Ce would be $(Gd_{0.990},Tb_{0.005},Dy_{0.005},Ce_{0.0000001})_2O_2S$ stoichiometrically, the amount of potassium phosphate monobasic $(KH_2PO_4)$ among the flux and sulfurizing agents was 15 g, not 36.3 g, and 100 g of lithium phosphate $(Li_3PO_4)$ was further used, and the mixture of the phosphor raw material and the fluxes and sulfurizing agents was fired for 4 hours, not 3 hours. The particle size and the particle size distribution of the phosphor were measured by a Coulter counter, and the average particle size was 9.0 μm and the standard deviation as represented by the quartile deviation (Q.D.) was 0.22.

Then, an image conversion screen of Example 6 was prepared in the same manner as in Example 1 except that the phosphor of Example 6 was used.

EXAMPLE 7

| | |
|---|---|
| Gadolinium oxide ($Gd_2O_3$, average particle size: 2.0 μm) | 718.0 g |
| Cerium oxide ($CeO_2$) | 0.07 mg |
| Terbium oxide ($Tb_4O_7$) | 3.74 g |
| Dysprosium oxide ($Dy_2O_3$) | 3.73 g |
| Zing oxide (ZnO) | 181.0 mg |

The above components were adequately mixed, and to the obtained phosphor raw material, the following flux and sulfurizing agents:

| | |
|---|---|
| Potassium phosphate monobasic ($KH_2PO_4$) | 30.0 g |
| Sodium carbonate ($Na_2CO_3$) | 280.0 g |
| Sulfur (S) | 220.0 g | were added and adequately mixed, and the mixture was packed in an alumina crucible and covered with a lid, and fired in the atmosphere at 1,050° C. for 3 hours. The obtained fired product was washed with water with stirring in water, the supernatant liquid was removed, and the fired product was further washed sequentially with 0.5 N hydrochloric acid and water, subjected to dehydration and drying, and baked in the air at 490° C. for 2 hours, followed by sieving for dispersion to obtain a phosphor of Example 7.

The crystal structure of the obtained phosphor was identified by means of an X-ray diffraction apparatus, and elemental analysis was carried out by means of a glow discharge mass spectrometer (GDMAS) and ICP. As a result, it was found that the compositional formula was $(Gd_{0.990}, Tb_{0.005}, Dy_{0.005}, Ce_{0.0000001})_2O_2S$ and the phosphor contained 20 ppm of Zn. Further, the particle size and the particle size distribution of the phosphor were measured by a Coulter counter, and the average particle size was 2.9 μm and the standard deviation as represented by quartile deviation (Q.D.) was 0.26. The diffuse reflectance of the phosphor of Example 7 at a wavelength of 550 nm was measured by means of a spectrophotometer, and it was 102% of that of the phosphor of Example 5 measured under the same conditions.

Then, an image conversion screen of Example 7 was prepared in the same manner as in Example 1 except that the phosphor of Example 7 was used.

EXAMPLE 8

A phosphor of Example 8 having a compositional formula of $(Gd_{0.990}, Tb_{0.005}, Dy_{0.005}, Ce_{0.0000001})_2O_2S$ and having a Zn content of 30 ppm based on the phosphor was produced in the same manner as in Example 7 except that 450 mg of zinc chloride ($ZnCl_2$) was used instead of 181 mg of zinc oxide (ZnO) to prepare a phosphor raw material, the flux and sulfurizing agents used in Example 7 and 36.0 g of sodium nitrate ($NaNO_3$) were added thereto as fluxes and sulfurizing agents, and the obtained mixture was fired. The particle size and the particle size distribution of the phosphor were measured by a Coulter counter, and the average particle size was 2.7 μm and the standard deviation as represented by the quartile deviation (Q.D.) was 0.27. The diffuse reflectance of the phosphor at a wavelength of 550 nm was 104% of that of the phosphor of Example 5 measured under the same conditions.

Then, an image conversion screen of Example 8 was prepared in the same manner as in Example 1 except that the phosphor of Example 8 was used.

EXAMPLE 9

A phosphor of Example 9 having a compositional formula of $(Gd_{0.990}, Tb_{0.005}, Dy_{0.005}, Ce_{0.0000001})_2O_2S$ and having a Zn content of 45 ppm based on the phosphor was produced in the same manner as in Example 7 except that $Gd_2O_3$ having an average particle size of 1.8 μm was used, 36 g of lithium phosphate ($Li_3PO_4$) and 36.0 g of sodium nitrate ($NaNO_3$) were used as fluxes instead of 30.0 g of potassium phosphate monobasic ($KH_2PO_4$), and the mixture of the phosphor raw material and the fluxes and sulfurizing agents was fired at 950° C. for 2.5 hours, not at 1,050° C. for 3 hours. The particle size and the particle size distribution of the phosphor were measured by a Coulter counter, and the average particle size was 2.4 μm and the standard deviation as represented by the quartile deviation (Q.D.) was 0.27.

Then, an image conversion screen of Example 9 was prepared in the same manner as in Example 1 except that the phosphor of Example 9 was used. The diffuse reflectance of the phosphor at a wavelength of 550 nm was 103% of that of the phosphor of Example 5 measured under the same conditions.

COMPARATIVE EXAMPLE 1

| | |
|---|---|
| Gadolinium oxide ($Gd_2O_3$) | 722.2 g |
| Terbium oxide ($Tb_4O_7$) | 3.0 g |

The above components were adequately mixed, and the following components were added thereto, followed by adequate mixing to prepare a phosphor raw material:

| | |
|---|---|
| Potassium phosphate monobasic ($KH_2PO_4$) | 36.3 g |
| Sodium carbonate ($Na_2CO_3$) | 280.0 g |
| Sulfur (S) | 220.0 g |

Then, the same operation as in Example 1 was carried out to produced a phosphor of Comparative Example 1 having a compositional formula of $(Gd_{0.996}, Tb_{0.004})_2O_2S$. The particle size and the particle size distribution of the phosphor were measured by a Coulter counter, and the average particle size was 5.0 μm and the standard deviation as represented by the quartile deviation (Q.D.) was 0.25.

Then, an image conversion screen of Comparative Example 1 was prepared in the same manner as in Example 1 except that the phosphor of Comparative Example 1 was used.

COMPARATIVE EXAMPLE 2

A phosphor of Comparative Example 2 having a compositional formula of $(Gd_{0.995}, Tb_{0.005})_2O_2S$ was produced in the same manner as in Example 1 except that gadolinium oxide ($Gd_2O_3$) and terbium oxide ($Tb_4O_7$) were mixed to prepare a phosphor raw material so that the molar ratio of Gd and Tb would be $(Gd_{0.995},Tb_{0.0005})_2O_2S$ stoichiometrically, 70.0 g of lithium phosphate ($Li_3PO_4$) and 30.0 g of disodium hydrogen phosphate ($Na_2HPO_4$) were used instead of 36.3 g of monobasic potassium phosphate as the flux, and the phosphor raw material was fired at 1,200° C. for 4 hours. The particle size and the particle size distribution of the phosphor were measured by a Coulter counter, and the average particle size was 8.0 μm and the standard deviation as represented by the quartile deviation (Q.D.) was 0.25.

Then, an image conversion screen of Comparative Example 2 was prepared in the same manner as in Example 1 except that the phosphor of Comparative Example 2 was used.

COMPARATIVE EXAMPLE 3

A phosphor of Comparative Example 3 having a compositional formula of $(Gd_{0.995},Tb_{0.005})_2O_2S$ was produced in the same manner as in Comparative Example 2 except that 30.0 g of potassium phosphate monobasic ($KH_2PO_4$) alone was used as the flux, and the phosphor raw material was fired at 1,100° C. for 3 hours. The particle size and the particle size distribution of the phosphor were measured by a Coulter counter, and the average particle size was 3.0 μm and the standard deviation as represented by the quartile deviation (Q.D.) was 0.25.

Then, an image conversion screen of Comparative Example 3 was prepared in the same manner as in Example 1 except that the phosphor of Comparative Example 3 was used.

EXAMPLE 10

The surface of a polyethylene terephthalate support having a light reflecting effect, having a titanium oxide powder incorporated therein, was uniformly coated with the coating dispersion of phosphor prepared at the time of preparation of the image conversion screen of Example 5 by means of a knife coater so that the weight of the coated phosphor after drying would be about 20 mg/cm². Then, before the coating dispersion of phosphor on the support dried, it was uniformly coated with the coating dispersion of phosphor prepared at the time of preparation of the image conversion screen of Example 4 by means of a knife coater so that the weight of the coated phosphor after drying would be about 50 mg/cm², followed by drying, and further, on the surface, a protective layer which is a polyethylene terephthalate film having a thickness of about 6 μm was laminated, to prepare an image conversion screen of Example 10 comprising two fluorescent layers.

EXAMPLE 11

The surface of a polyethylene terephthalate support having a light reflecting effect, having a titanium oxide powder incorporated therein, was uniformly coated with the coating dispersion of phosphor prepared at the time of preparation of the image conversion screen of Example 8 by means of a knife coater so that the weight of the coated phosphor after drying would be about 20 mg/cm². Then, before the coating dispersion of phosphor on the support dried, it was uniformly coated with the coating dispersion of phosphor prepared at the time of preparation of the image conversion screen of Example 4 by means of a knife coater so that the weight of the coated phosphor after drying would be about 50 mg/cm², followed by drying, and further, on the surface, a protective layer which is a polyethylene terephthalate film having a thickness of about 6 μm was laminated, to prepare an image conversion screen of Example 11 comprising two fluorescent layers.

EXAMPLE 12

The surface of a polyethylene terephthalate support having a light reflecting effect, having a titanium oxide powder incorporated therein, was uniformly coated with the coating dispersion of phosphor prepared at the time of preparation of the image conversion screen of Example 9 by means of a knife coater so that the weight of the coated phosphor after drying would be about 20 mg/cm². Then, before the coating dispersion of phosphor on the support dried, it was uniformly coated with the coating dispersion of phosphor prepared at the time of preparation of the image conversion screen of Example 6 by means of a knife coater so that the weight of the coated phosphor after drying would be about 50 mg/cm², followed by drying, and further, on the surface, a protective layer which is a polyethylene terephthalate film having a thickness of about 6 μm was laminated, to prepare an image conversion screen of Example 12 comprising two fluorescent layers.

COMPARATIVE EXAMPLE 4

An image conversion screen of Comparative Example 4 was prepared in the same manner as in Example 10, except that the coating dispersion of phosphor for the image conversion screen of Comparative Example 3 was used instead of the coating dispersion of phosphor for the image conversion screen of Example 5, and the coating dispersion of phosphor for the image conversion screen of Comparative Example 2 was used instead of the coating dispersion of phosphor for the image conversion screen of Example 4.

Of each of the phosphors of Examples 1 to 9 and the phosphors of Comparative Examples 1 to 3 thus obtained, the average particle size and the standard deviation of the particle size distribution as represented by the quartile deviation (Q.D.), as measured by a Coulter counter, are shown in Table 1 together with the composition of each phosphor including the Zn content in the phosphor.

Further, in Table 2, the composition of each phosphor to be used for the fluorescent layer in each image conversion screen, and the relative values of the emission luminance and the amount of afterglow as measured under the same conditions as for the image conversion screen of Example 1, relative to the emission luminance and the amount of afterglow of the image conversion screen of Comparative Example 1, with respect to each of the image conversion screens of Examples 1 to 12 and Comparative Examples 1 to 4 as obtained above, are shown.

TABLE 1

|  | Phosphor composition | Zn (ppm) | Average particle size (μm) | Particle size distribution (Q.D.) |
|---|---|---|---|---|
| Ex. 1 | $(Gd_{0.991}, Tb_{0.004}, Dy_{0.005}, Ce_{0.0000001})_2O_2S$ | — | 5.0 | 0.25 |
| Ex. 2 | $(Gd_{0.990}, Tb_{0.005}, Dy_{0.005}, Ce_{0.0000001})_2O_2S$ | — | 5.2 | 0.25 |
| Ex. 3 | $(Gd_{0.990}, Tb_{0.003}, Dy_{0.007}, Ce_{0.0000001})_2O_2S$ | — | 5.1 | 0.25 |

TABLE 1-continued

| | Phosphor composition | Zn (ppm) | Average particle size ($\mu$m) | Particle size distribution (Q.D.) |
|---|---|---|---|---|
| Ex. 4 | $(Gd_{0.990}, Tb_{0.005}, Dy_{0.005}, Ce_{0.0000001})_2O_2S$ | — | 8.0 | 0.23 |
| Ex. 5 | $(Gd_{0.990}, Tb_{0.005}, Dy_{0.005}, Ce_{0.0000001})_2O_2S$ | — | 3.0 | 0.26 |
| Ex. 6 | $(Gd_{0.990}, Tb_{0.005}, Dy_{0.005}, Ce_{0.0000001})_2O_2S$ | — | 9.0 | 0.22 |
| Ex. 7 | $(Gd_{0.990}, Tb_{0.005}, Dy_{0.005}, Ce_{0.0000001})_2O_2S$ | 20 | 2.9 | 0.26 |
| Ex. 8 | $(Gd_{0.990}, Tb_{0.005}, Dy_{0.005}, Ce_{0.0000001})_2O_2S$ | 30 | 2.7 | 0.27 |
| Ex. 9 | $(Gd_{0.990}, Tb_{0.005}, Dy_{0.005}, Ce_{0.0000001})_2O_2S$ | 45 | 2.4 | 0.27 |
| Comp. Ex. 1 | $(Gd_{0.996}, Tb_{0.004})_2O_2S$ | — | 5.0 | 0.25 |
| Comp. Ex. 2 | $(Gd_{0.995}, Tb_{0.005})_2O_2S$ | — | 8.0 | 0.25 |
| Comp. Ex. 3 | $(Gd_{0.995}, Tb_{0.005})_2O_2S$ | — | 3.0 | 0.25 |

TABLE 2

| | Fluorescent layer | | | |
|---|---|---|---|---|
| | Phosphor composition | Weight of coating (mg/cm$^2$) | Relative brightness | Relative amount of afterglow |
| Ex. 1 | Composition of Ex. 1 | 70 | 110 | 0.1 |
| Ex. 2 | Composition of Ex. 2 | 70 | 111 | 0.1 |
| Ex. 3 | Composition of Ex. 3 | 70 | 109 | 0.05 |
| Ex. 4 | Composition of Ex. 4 | 70 | 113 | 0.1 |
| Ex. 5 | Composition of Ex. 5 | 70 | 80 | 0.1 |
| Ex. 6 | Composition of Ex. 6 | 70 | 117 | 0.1 |
| Ex. 7 | Composition of Ex. 7 | 70 | 81 | 0.1 |
| Ex. 8 | Composition of Ex. 8 | 70 | 82 | 0.1 |
| Ex. 9 | Composition of Ex. 9 | 70 | 78 | 0.1 |
| Ex. 10 | | | 115 | 0.1 |
| | Underlayer: Composition of Ex. 5 | 20 | | |
| | Upperlayer: Composition of Ex. 4 | 50 | | |
| Ex. 11 | | | 117 | 0.1 |
| | Underlayer: Composition of Ex. 8 | 20 | | |
| | Upperlayer: Composition of Ex. 4 | 50 | | |
| Ex. 12 | | | 122 | 0.1 |
| | Underlayer: Composition of Ex. 9 | 20 | | |
| | Upperlayer: Composition of Ex. 6 | 50 | | |
| Comp. Ex. 1 | Composition of Comp. Ex. 1 | 70 | 100 | 1 |
| Comp. Ex. 2 | Composition of Comp. Ex. 2 | 70 | 103 | 1 |
| Comp. Ex. 3 | Composition of Comp. Ex. 3 | 70 | 72 | 1 |
| Comp. Ex. 4 | | | 105 | 0.1 |
| | Underlayer: Composition of Comp. Ex. 3 | 20 | | |
| | Upperlayer: Composition of Comp. Ex. 2 | 50 | | |

As evident from Tables 1 and 2, in view of the emission luminance, by comparison among image conversion screens employing phosphors having substantially the same particle size, a remarkable improvement of the emission luminance could be seen in the image conversion screens of Examples 1 to 3 of the present invention employing the phosphor of the present invention for a fluorescent layer and the image conversion screen of Example 5 employing the phosphor of the present invention for a fluorescent layer, as compared with the image conversion screen of Comparative Example 1 employing a conventional phosphor for a fluorescent layer and the image conversion screen of Comparative Example 3 employing a conventional phosphor for a fluorescent layer, respectively.

Further, also with respect to the image conversion screen comprising two fluorescent layers, the emission luminance remarkably improved with the image conversion screen of Example 10 of the present invention as compared with a conventional image conversion screen of Comparative Example 4. Further, the emission luminance remarkably improved with the image conversion screens of Examples 11 and 12 wherein a fluorescent layer comprising the phosphor of the present invention in the form of fine particles, containing Zn, having a white body color and having a high powder reflectance, was disposed on the underlayer side, as compared with the conventional image conversion screen of Comparative Example 4.

On the other hand, with respect to the degree of the afterglow, as evident from the comparison between Examples and Comparative Examples, the afterglow of the image conversion screens of the present invention decreased to the level of from one tenth to one twentieth as compared with the afterglow of a conventional image conversion screen.

The phosphor of the present invention employing the above construction, agrees with the photo-detecting sensitivity of a photoelectric conversion element such as a light semiconductor having a spectral sensitivity in a wavelength region of green color, and exhibits emission with a short afterglow, whereby it makes it possible to provide a radiographic image conversion screen exhibiting a high sensitive emission by combination with a photoelectric conversion element. With the radiograph-forming device of the present invention employing the screen, the sensitivity in radiograph-forming system improves, and accordingly the exposure amount of an object such as a patient at the time of taking a radiograph can be decreased, and a high image quality radiograph which is free from deterioration in image quality due to an influence of e.g. afterglow, can be obtained.

The entire disclosures of Japanese Patent Application No. 2001-191427 filed on Jun. 25, 2001 and Japanese Patent Application No. 2002-132348 filed on May 8, 2002 including specifications, claims, drawings and summaries are incorporated herein by reference in their entireties.

What is claimed is:

1. A gadolinium oxysulfide phosphor for digital radiography represented by the following compositional formula, which mainly emits a green luminescence under excitation with radiation:

$(Gd_{1-x-y-z}, Tb_x, Dy_y, Ce_z)_2O_2S$ wherein x, y and z are numbers which satisfy $1.2 \times 10^{-3} \leq x \leq 1.9 \times 10^{-2}$, $5 \times 10^{-4} \leq y \leq 1.9 \times 10^{-2}$ and $10^{-8} \leq z \leq 8 \times 10^{-7}$, respectively.

2. The gadolinium oxysulfide phosphor for digital radiography according to claim 1, which contains zinc (Zn).

3. The gadolinium oxysulfide phosphor for digital radiography according to claim 2, wherein the content of zinc (Zn) is from 10 to 100 ppm.

4. The gadolinium oxysulfide phosphor for digital radiography according to claim 1, which has an average particle size of from 1 to 5 $\mu$m.

5. The gadolinium oxysulfide phosphor for digital radiography according to claim 1, wherein the maximum peak wavelength of the emission spectrum of the phosphor is within a wavelength range of from 520 to 580 nm.

6. A radiographic image conversion screen which comprises a support and a fluorescent layer made of a mixture of a binder and a phosphor formed on the support, wherein the phosphor is a gadolinium oxysulfide phosphor for digital-radiography as defined in claim 1.

7. The radiographic image conversion screen according to claim 6, which comprises a plurality of the fluorescent layers.

8. The radiographic image conversion screen according to claim 7, wherein at least the fluorescent layer in contact with the support comprises the gadolinium oxysulfide phosphor for digital radiography, wherein the gadolinium oxysulfide phosphor has an average particle size of from 1 to 5 $\mu$m.

9. A radiograph-forming device, comprising at least a radiographic image conversion screen which absorbs radiation transmitted through an object and forms a fluorescence image of the object, a plurality of photoelectric conversion elements disposed on each of regions on the screen two-dimensionally and finely divided in a matrix, a processing means which processes disposition signals and detections signals from each of the photoelectric conversion elements corresponding to the radiation fluorescence image formed by the radiation for two-dimensional synthesis and outputs digital image signals corresponding to the fluorescence image formed by the radiation, and an image reproduction means which inputs the digital image signals from the processing means to reproduce the fluorescence image formed by the radiation, wherein the radiographic image conversion screen is a radiographic image conversion screen as defined in claim 6.

* * * * *